US009346495B2

(12) United States Patent
Zurinski et al.

(10) Patent No.: US 9,346,495 B2
(45) Date of Patent: May 24, 2016

(54) MACHINE CABIN HAVING IMPROVED OPERATOR VISIBILITY

(71) Applicant: Caterpillar Inc., Peoria, IL (US)

(72) Inventors: Jeffrey A. Zurinski, Oglesby, IL (US); Aaron L. Dunaway, Brimfield, IL (US); Matthew J. Gielda, Peoria, IL (US); Thomas A. Jenne, Washington, IL (US); Rajesh Mishra, Dunlap, IL (US); Christian D. Ritchie, Morton, IL (US); Brent R. Frazier, Morton, IL (US); Matthew J. Rettick, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/676,417

(22) Filed: Apr. 1, 2015

(65) Prior Publication Data
US 2015/0298749 A1 Oct. 22, 2015

Related U.S. Application Data

(60) Provisional application No. 61/982,173, filed on Apr. 21, 2014.

(51) Int. Cl.
*B62D 33/06* (2006.01)
*B60H 1/00* (2006.01)
*B60H 3/06* (2006.01)

(52) U.S. Cl.
CPC ........ *B62D 33/0617* (2013.01); *B60H 1/00207* (2013.01); *B60H 1/00564* (2013.01); *B60H 3/0658* (2013.01); *B60H 2001/00221* (2013.01); *B60H 2001/00235* (2013.01)

(58) Field of Classification Search
CPC .... B62D 33/06; B62D 33/0617; B60R 21/11; B60R 21/13; B60H 1/00; B60H 1/00207; B60H 1/00221; B60H 1/00235; B60H 3/0658
USPC ............. 296/190.01, 190.03, 190.08, 190.09, 296/102; 180/89.12; 280/756; D15/30
See application file for complete search history.

(56) References Cited

U.S. PATENT DOCUMENTS

| | | |
|---|---|---|
| 2,583,918 A | 1/1952 | Wilson |
| 2,921,799 A | 1/1960 | Hatten |
| 3,866,942 A | 2/1975 | Dobeus et al. |
| 3,990,738 A | 11/1976 | Kolinger et al. |
| 4,099,763 A | 7/1978 | Maier et al. |
| 5,413,188 A * | 5/1995 | Ui .......................... B60J 5/0487 180/89.12 |
| 6,485,084 B2 | 11/2002 | Sorensen et al. |

(Continued)

FOREIGN PATENT DOCUMENTS

| | | |
|---|---|---|
| CN | 203160307 | 8/2013 |
| DE | 2 225 850 | 5/1972 |

(Continued)

*Primary Examiner* — Gregory Blankenship
(74) *Attorney, Agent, or Firm* — Finnegan, Henderson, Farabow, Garrett & Dunner, LLP; Edward Lin

(57) ABSTRACT

A cabin is disclosed for use with a mobile machine. The cabin may have a floor and a roof. The cabin may also have at least one A-post located at a leading end relative to a forward travel direction of the mobile machine, and a C-post located at a trailing end opposite the at least one A-post. The C-post may have two terminal ends located at the floor, and a single terminal end located at the roof.

14 Claims, 7 Drawing Sheets

(56) References Cited

U.S. PATENT DOCUMENTS

| | | | |
|---|---|---|---|
| 6,543,840 B2 | 4/2003 | Colliar et al. | |
| 7,001,135 B2 | 2/2006 | Shimokakiuchi et al. | |
| D528,134 S * | 9/2006 | Vandendriessche | D15/30 |
| 7,243,982 B2 | 7/2007 | Kelley et al. | |
| 7,261,321 B2 | 8/2007 | Della Valle | |
| 7,347,488 B2 | 3/2008 | Hayes et al. | |
| 7,380,626 B2 | 6/2008 | Chikaishi et al. | |
| D595,745 S * | 7/2009 | Jorgensen | D15/30 |
| 8,152,226 B2 | 4/2012 | Iwakata et al. | |
| 8,267,467 B2 | 9/2012 | Takaoka et al. | |
| 8,579,363 B2 * | 11/2013 | Davis | B60R 21/131 180/9.46 |
| 8,702,154 B1 * | 4/2014 | Gielda | B60R 21/131 280/756 |
| 2002/0027380 A1 * | 3/2002 | Teich | B62D 33/0617 296/190.08 |
| 2005/0156422 A1 * | 7/2005 | Della Valle | B60R 21/131 280/756 |
| 2005/0280286 A1 * | 12/2005 | Kelley | E02F 9/163 296/190.08 |
| 2007/0046070 A1 * | 3/2007 | Hayes | E02F 9/166 296/190.08 |
| 2007/0182147 A1 * | 8/2007 | Cooper | B60R 21/131 280/756 |
| 2010/0156144 A1 | 6/2010 | Iwakata et al. | |
| 2010/0314908 A1 | 12/2010 | Wood, Jr. et al. | |
| 2011/0241380 A1 * | 10/2011 | Mayr | B62D 25/24 296/190.09 |
| 2014/0217778 A1 * | 8/2014 | Gielda | B60R 21/13 296/190.03 |
| 2014/0217779 A1 * | 8/2014 | Gielda | B60R 21/13 296/190.03 |
| 2015/0000996 A1 * | 1/2015 | Nagami | E02F 9/163 180/291 |
| 2015/0108789 A1 * | 4/2015 | Knoblett | B62D 33/0617 296/190.03 |

FOREIGN PATENT DOCUMENTS

| | | |
|---|---|---|
| DE | 3 128 284 | 2/1983 |
| FR | 2 338 835 | 8/1977 |
| JP | 2000 273909 | 10/2000 |
| JP | 2013 010504 | 1/2013 |
| WO | WO 2013/010705 | 1/2013 |

* cited by examiner

MACHINE CABIN HAVING IMPROVED OPERATOR VISIBILITY

RELATED APPLICATIONS

This application is based on and claims priority to U.S. Provisional Application No. 61/982,173 filed on Apr. 21, 2014, the contents of which are expressly incorporated herein by reference.

TECHNICAL FIELD

The present disclosure relates generally to a machine cabin and, more particularly to a machine cabin having improved operator visibility.

BACKGROUND

Earth working and construction type machines, such as motor graders, excavators, wheel loaders, agricultural tractors, dozers and other similar machines, each include a cabin from which an operator controls movement of the machine and its associated work tools. The cabin shields the operator from harsh environmental conditions, and also protects the operator from injury in case of machine rollover. In order for the operator to be effective and efficient in controlling the machine, the operator should be provided with unobstructed views of critical areas surrounding the machine. These areas can include forward-located tool movement zones, side-located wheel (or track) locations, and rear quarter locations where machine collisions can occur.

A typical machine cabin is formed from a floor, a roof, and upright posts that extend between the floor and the roof. The posts are classified into one of three categories, depending on their location and function within the cabin. Specifically, a cabin typically includes A-posts, B-posts, and C-posts. A-posts are generally located at the front corners of the operator cabin, while C-posts are located at the rear corners of the cabin. A windshield is mounted between the A-posts, and a back wall and/or rear window is mounted between the C-posts. B-posts are located between the A-posts and the C-posts (i.e., at the sides of the cabin) and are used for mounting doors of the cabin.

An exemplary machine cabin is disclosed in U.S. Pat. No. 6,543,840 that issued to Colliar on Apr. 8, 2003 ("the '840 patent"). In the '840 patent, an attempt is made to improve operator visibility from within the cabin by eliminating the B-posts described above. In addition, the C-posts are curved outward towards sides of the cabin at an upper portion near the roof, so as to pass over wheel wells of the associated machine. This configuration allows the C-posts to support a rear window in a more compact configuration.

Although the machine cabin of the '840 patent may improve visibility in small-machine applications, it may still be less than optimal. In particular, the machine cabin of the '840 patent may not be suitable for large-machine applications, where B-posts are required for structural strength and rigidity. Further, the A- and C-posts, being located at corners of the machine cabin, may inhibit the operator from effectively viewing the tool movement zones and the rear quarter locations discussed above. Further, the structure of the machine cabin disclosed in the '840 patent may make packaging of associated electrical wiring and HVAC conduits difficult.

The disclosed machine cabin is directed to overcoming one or more of the problems set forth above and/or other problems of the prior art.

SUMMARY

In one aspect, the present disclosure is directed to a cabin for a machine. The cabin may include a floor and a roof. The cabin may also include at least one A-post located at a leading end relative to a forward travel direction of the mobile machine, and a C-post located at a trailing end opposite the at least one A-post. The C-post may have two terminal ends located at the floor, and a single terminal end located at the roof.

In another aspect, the present disclosure is directed to another cabin for a machine. This cabin may include a floor, a roof, and a plurality of posts connecting the floor to the roof. The plurality of posts may include two A-posts, two B-posts, and a single C-post. From an internal seat index axis located along a fore/aft center plane of symmetry in a rear half of the cabin, four external views are provided through corners of the cabin that are unobstructed by the plurality of posts. A horizontal viewing angle from the internal seat index axis between one of the two B-posts and the C-Post is about 1.5-2 times a horizontal view angle between the one of the two B-posts and one of the two A-posts.

In another aspect, the present disclosure is directed to another cabin for a machine. This cabin may include a floor, a roof, and at least one A-post located at a leading end relative to a forward travel direction of the mobile machine. The cabin may also include a C-post located at a trailing end opposite the at least one A-post. The C-post may be fabricated from two parallel spaced-apart beams to form a recess therebetween. At least one of an air handling duct and a wiring harness may be mounted within the recess of the C-post.

In another aspect, the present disclosure is directed to another cabin for a machine. This cabin may include a floor, a roof, at least one A-post located at a leading end relative to a forward travel direction of the mobile machine, and a C-post located at a trailing end opposite the at least one A-post. The C-post may be fabricated from a 3-sided box-like structure having an inward facing opening. The cabin may also include an air filter removably disposed in the inward facing opening of the C-post.

DETAILED DESCRIPTION

Figure 1:
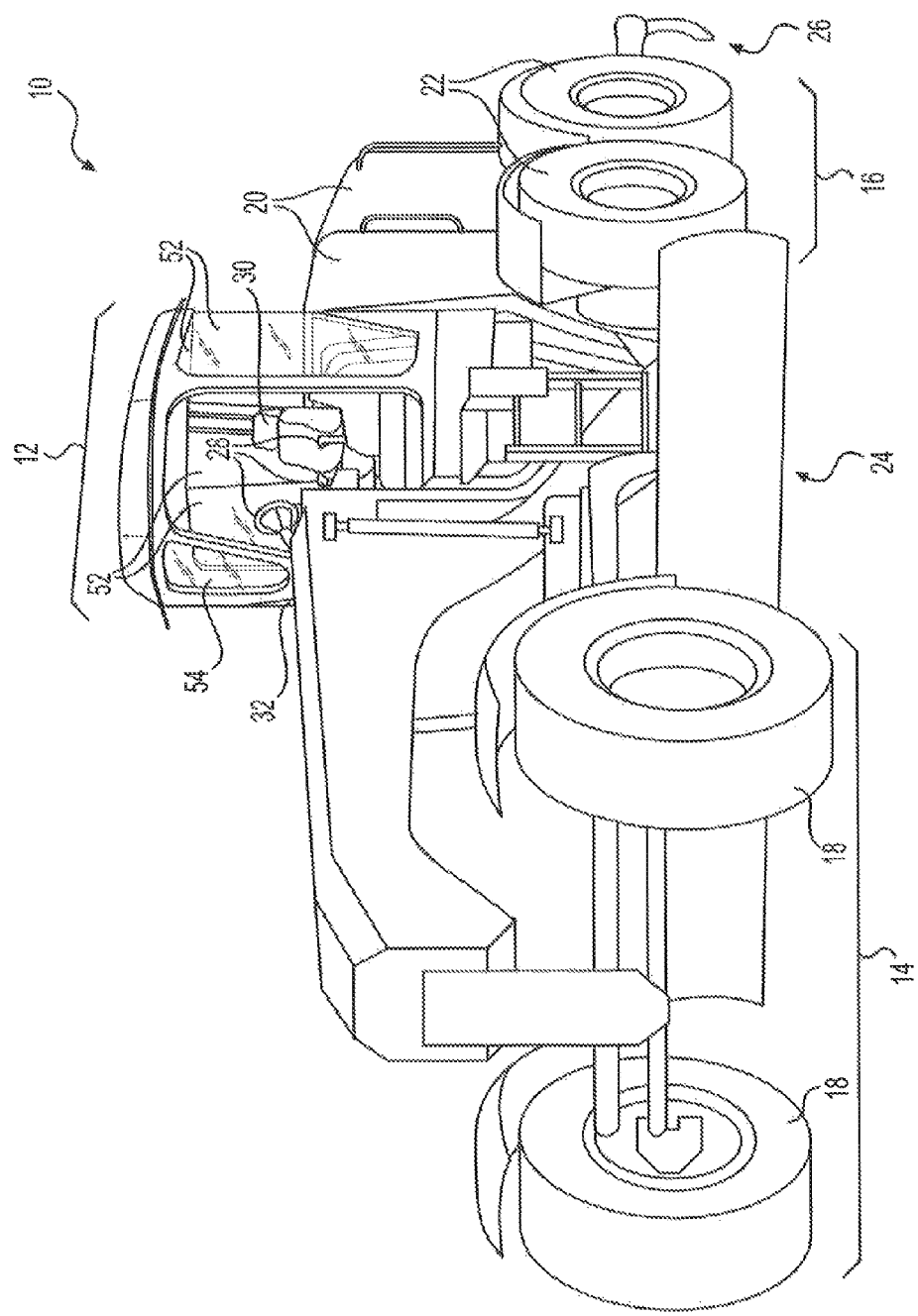
FIG. 1 is an isometric illustration of an exemplary disclosed machine.

FIG. 1 illustrates a mobile machine 10 having an exemplary cabin 12, from which an operator may control movements of machine 10. In the depicted example, machine 10 is a motor grader. It is contemplated, however, that machine 10 could alternatively embody another type of earthmoving and/or construction machine, such as an excavator, a wheel loader, an agricultural tractor, a dozer, or another similar machine.

As a motor grader, machine 10 may include a steerable front frame 14 and a driven rear frame 16 that is pivotally connected to front frame 14. Front frame 14 may include a pair of front wheels 18 (or other traction devices), and support cabin 12. Rear frame 16 may include compartments 20 for housing a power source (e.g., an engine) and associated cooling components, the power source being operatively coupled to rear wheels 22 (or other traction devices) for primary propulsion of machine 10. Rear wheels 22 may be arranged in tandems on opposing sides of rear frame 16. Steering of machine 10 may be a function of both front wheel steering and articulation of front frame 14 relative to rear frame 16.

Machine 10 may also include one or more ground engaging tools such as, for example, a drawbar-circle-moldboard (DCM) 24 that is operatively connected to and supported by front frame 14, and a ripper assembly 26 that is operatively connected to and supported by rear frame 16. It is contemplated that DCM 24 and/or ripper assembly 26 may be connected to and supported by another portion of machine 10, if desired, such as by another portion of front frame 14 and/or rear frame 16. Both of DCM 24 and ripper assembly 26 may be movable via separate hydraulic ram arrangements. The hydraulic ram arrangements may be configured to shift DCM 24 and ripper assembly 26 vertically toward and away from front frame 14, shift DCM 24 and ripper assembly 26 side-to-side, and/or rotate DCM 24 and ripper assembly 26 about a horizontal or vertical axis. It is contemplated that DCM 24 and ripper assembly 26 may move in additional and/or different ways than described above, if desired. It is also contemplated that additional, different, and/or fewer ground engaging tools may be connected to machine 10.

Cabin 12 may house components configured to receive input from a machine operator indicative of a desired machine and/or work tool movement. Specifically, cabin 12 may house one or more input devices 28 embodied, for example, as single or multi-axis joysticks located proximal an operator seat 30. Input devices 28 may be proportional-type controllers configured to position or orient machine 10 and the work tools by producing position signals indicative of desired speeds and/or forces in a particular direction. It is contemplated that different input devices may alternatively or additionally be included within cabin 12 such as, for example, wheels, knobs, push-pull devices, switches, pedals, and other operator input devices known in the art. The operator of machine 10 may gain access to cabin 12 (and thus to input devices 28 and seat 30) by way of a door 32 located at each side of machine 10 (one door 32 removed from the left side of machine 10 for clarity).

During operation of machine 10, the operator may manipulate input devices 28 from inside cabin 12 to perform tasks that require high precision. For example, the operator may need to position DCM 24 and/or ripper assembly 26 at a precise location and in a precise orientation in order to create a desired contour at a worksite without causing collision with another portion of machine 10 and/or with obstacles at the worksite. Similarly, the operator may need to move machine 10 itself along a precise trajectory. And in order for the operator to make these movements accurately and efficiently, and without damaging machine 10 or its surroundings, the operator must have a clear view of critical areas surrounding machine 10. These areas may include, for example, front-left and front-right corners of machine 10, where wheels 18 and ends of DCM 24 engage surface material; and rear-left and rear-right corners of machine 10, where wheels 22 and ripper assembly 26 engage surface material.

Figure 2:
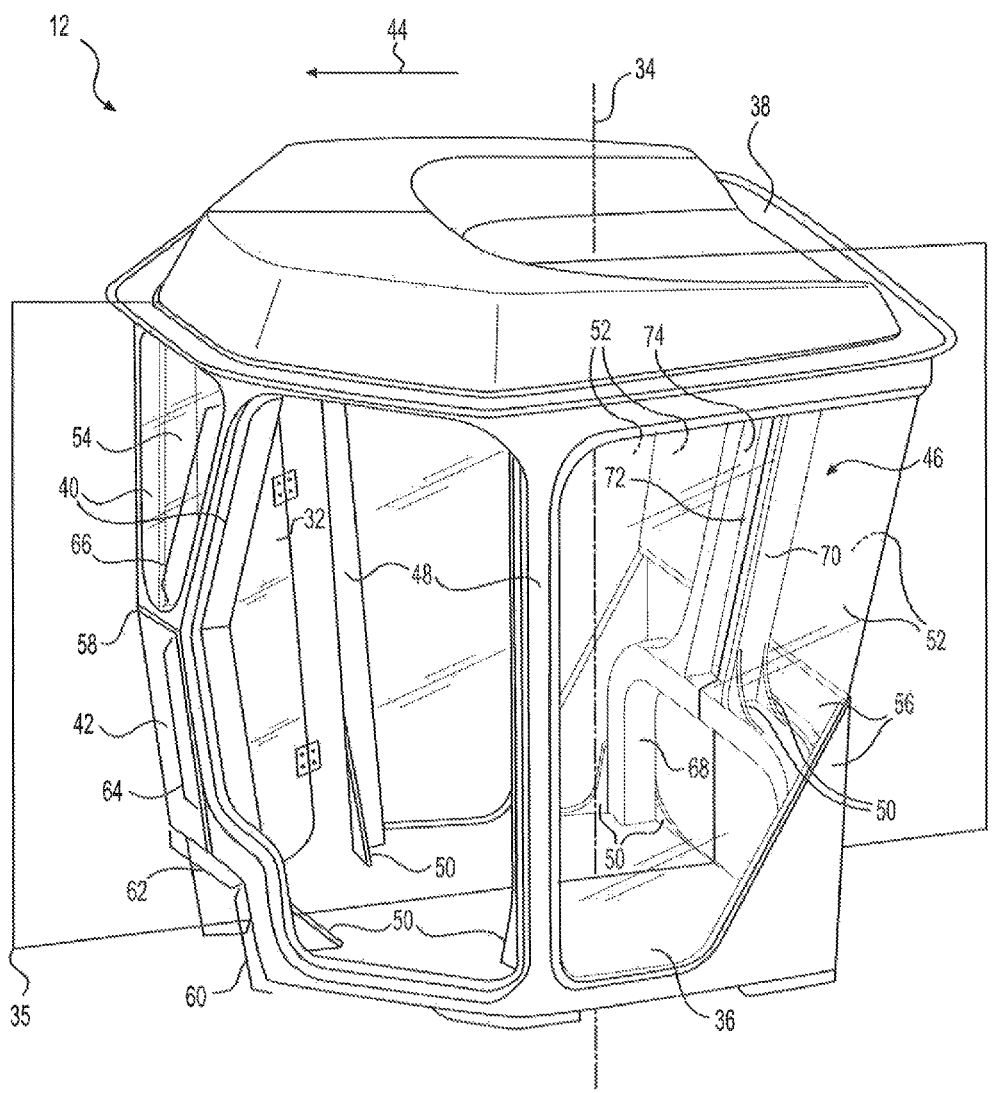
FIG. 2 is an isometric illustration of an exemplary disclosed cabin that may be used in conjunction with the machine of FIG. 1.

FIG. 2 is a simplified illustration of an exemplary cabin 12 that provides unobstructed views of the critical areas described above. In this illustration, input devices 28, seat 30, and one of doors 32 have been removed for clarity. A vertical index axis 34 is shown that represents a location from within cabin 12 of an operator's perspective. Index axis 34 may represent a general position of the operator's eyes, with varying height, when the operator is situated in seat 30 (referring to FIG. 1). Index axis 34 may lie in a fore/aft plane of symmetry ("plane") 35, and pass through a location normally occupied by the operator in seat 30 (i.e., at a back half of cabin 12).

Cabin 12 may include a floor 36, a roof 38, and a plurality of upright posts that extend from floor 36 to roof 38. The posts may consist of a pair of A-posts 40 joined to each other by way of a plate 42 and located at a leading end of cabin 12 relative to a forward travel direction of machine 10 (designated by an arrow 44), a single C-post 46 located at an opposing trailing end of cabin 12, and two B-posts 48 located between A-posts 40 and C-post 46 (i.e., at opposing sides of cabin 12). Each of posts 40, 46, and 48 may be fabricated separately, and then joined together and/or joined to floor 36 and roof 38 (e.g., by way of welding). One or more gussets 50 may be used to enhance these connections, if desired. Doors 32 may be mounted between A- and B-posts 40, 48; and windows 52 may be mounted between B- and C-posts 48, 46. It is contemplated that two separate window panes oriented at about 90° to each other may make up each of windows 52, or that a single angled or curved window may be used, as desired. In some embodiments, a front window 54 may be mounted between A-posts 40, at a location above plate 42. In one example, front window 54 may be triangularly-shaped, with may further include corners having a radius curvature. In another example, front window 54 may be trapezoidally-shaped, wherein an upper side is longer than a lower side. A generally three-sided body panel 56 (or three separate panels) may be mounted to C-post 46 at a location below windows 52.

Figure 3:
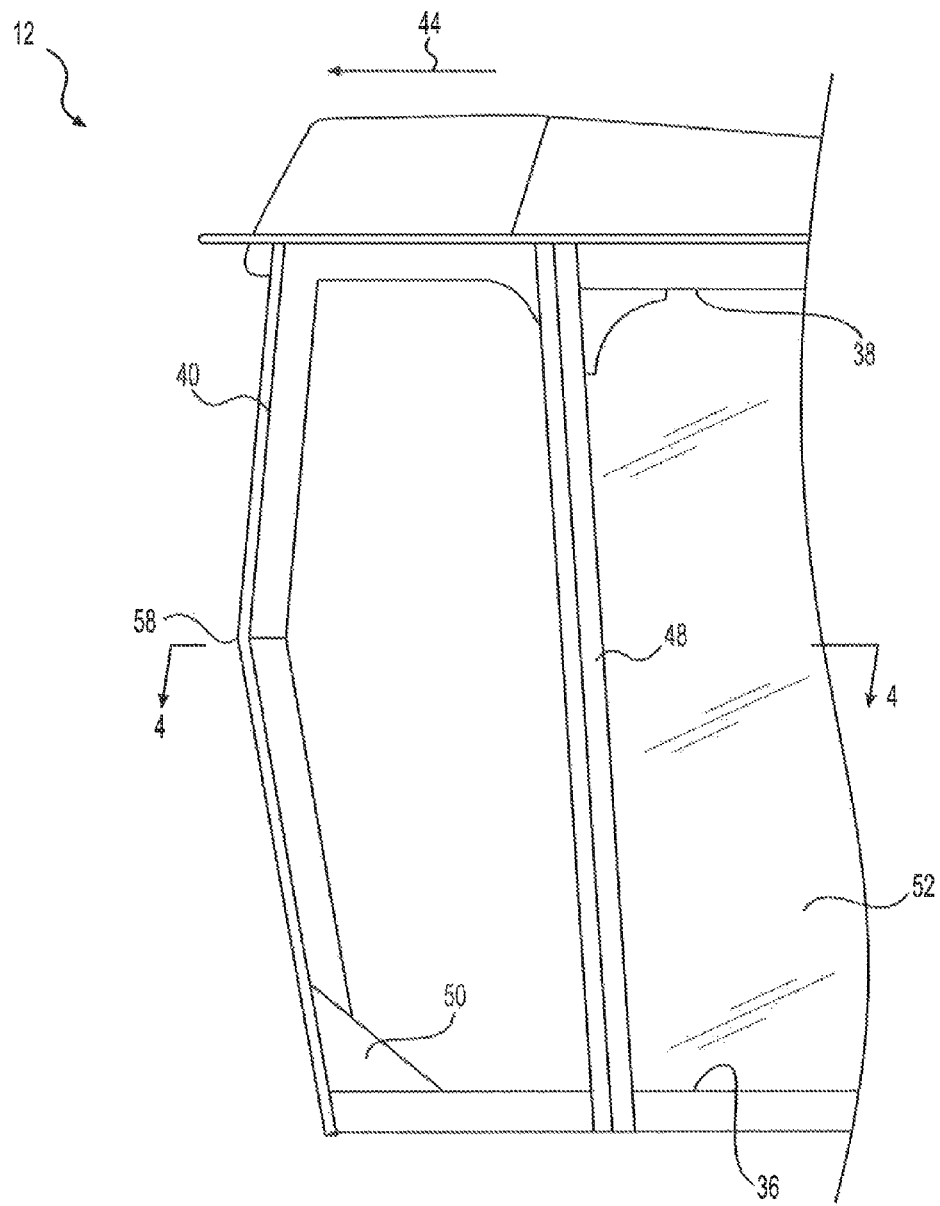
FIG. 3 is a side-view illustration of exemplary portion of the cabin of FIG. 2.
Figure 4:
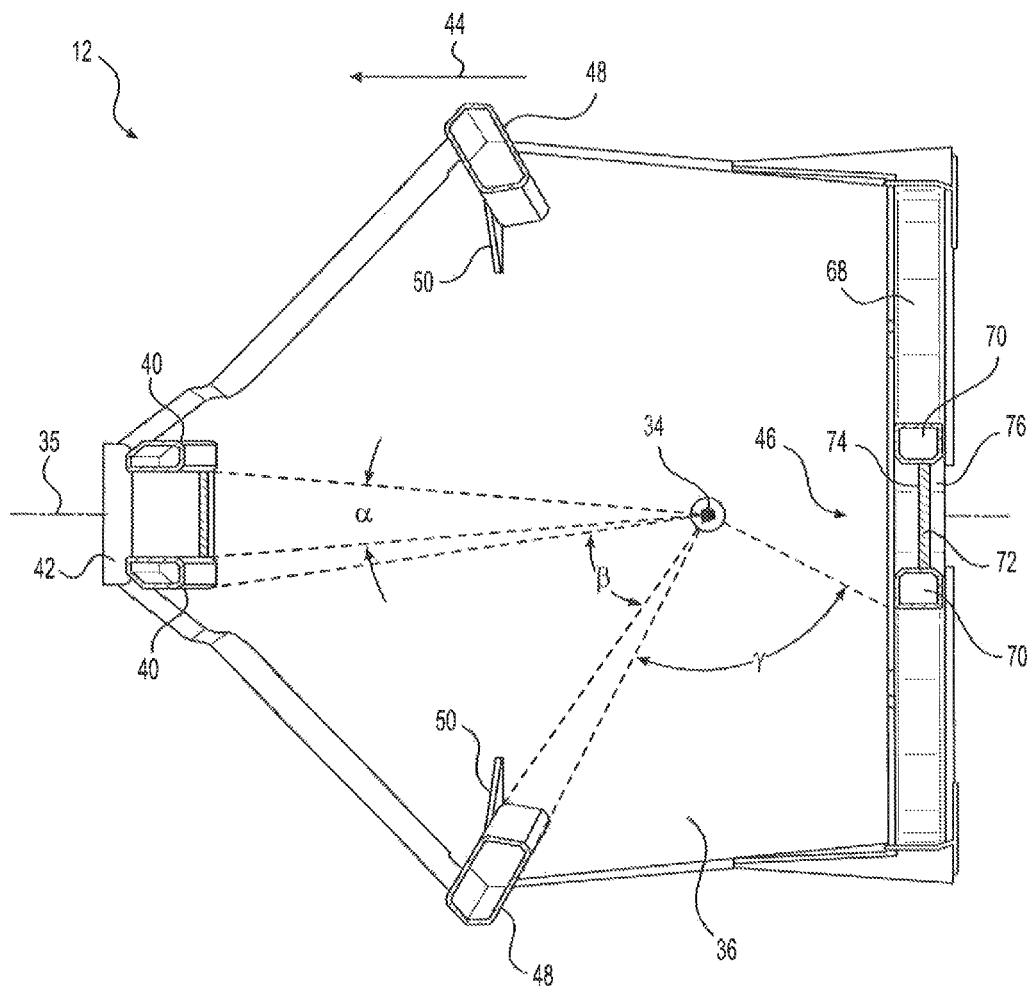
FIG. 4 is a cross-sectional top view illustration of the cabin of FIG. 2.

Each of A-, B-, and C-posts 40, 46, 48 may be oriented vertically (e.g., to align with plane 35 and/or axis 34) or tilted, as desired. For example, one or more of these posts may be tilted outward at roof 38, such that roof 38 has a larger surface area and overhangs floor 36. This configuration may provide greater space within cabin 12 and help to shed water away from cabin 12. FIGS. 2 and 4 show B-posts 48 and C-post 46 tilted outward. A-posts 40, however, are shown in FIG. 3 as having a compound tilt. That is, an intermediate point 58 of A-posts 40 located at a transition between plate 42 and window 54 may extend outward (i.e., forward in the direction of arrow 44) a greater distance than either end of A-posts 40 at floor 36 and roof 38. And the tilt angle of A-posts 40 may be different above and below intermediate point 58. In particular, each A-post 40 may tilt to about 0-10° away from vertical above intermediate point 58, and to about 5-15' below intermediate point 58. In one example, a tilt angle ratio of each A-post 40 above intermediate point 58 relative to below intermediate point 58 may be about 0.4-0.6. This ratio may provide clearance between plate 42 and a main beam of front frame 14 (referring to FIG. 1), while also providing an unobstructed forward view through the space between A-posts 40.

FIG. 4 shows a cross-sectional view of cabin 12 taken through intermediate point 58, oriented downward toward floor 36. As can be seen in this figure, at least five different views, (including four primary corner views) may be provided to the operator of machine 10 from the perspective of index axis 34. These views include (in clockwise order) a front view between A-posts 40 (i.e., through window 54); a front-right view between the right-most A-post 40 and the B-post 48 located at the right side of cabin 12 (i.e., through the right side door 32); a rear-right view between the right B-post 48 and C-post 46 (i.e., through the right side window 52); a rear-left view between C-post 46 and the B-post 48 located at the left side of cabin 12 (i.e., through the left side window 52);

and a front-left view between the left B-post 48 and the left-most A-post 40 (i.e., through the left side door 32). The front view through window 54 may correspond with an angle α that, because of the triangular shape of window 54, varies between about 0° at intermediate point 58 to about 25-35° at roof 38. The front-left and front-right views through the left and right doors 32 may correspond with an angle β at intermediate point 58 that is about 45-50°. The rear-left and rear-right views through windows 52 may correspond with an angle γ at intermediate point 58 that is about 75-90°. In this arrangement, a ratio of rear-corner view to front corner view may be about 1.5-2, with a total horizontal viewing angle from index axis 34 of about 260-270°. As shown in the plan view of FIG. 4, the locations of A-, B-, and C-posts 40, 48, 46 may together define a diamond shape, when virtual lines are connected between adjacent posts, this shape being characteristic of the types of corner views described above.

Returning to FIG. 2, each A-post 40 may mirror each other across plane 35, and consist of four different segments that are either continuously formed or separately formed and subsequently welded together. These four segments may include a base segment 60 connected at one end to floor 36 and generally aligned with plane 35, a knee segment 62 connected to a distal end of base segment 60 and angled inward toward plane 35, a center segment 64 connected to knee segment 62 and generally aligned with plane 35, and an upper segment 66 connected between center segment 64 and roof 38 and angled outward away from plane 35 at roof 38. Plate 42 may be connected to center segments 64 of both A-posts 40, and base, knee, and center segments 60-64 may all tilt forward at the same angle toward intermediate point 58. Upper segment 66 may also tilt forward from roof 38 toward intermediate point 58. A latch mechanism (not shown) may be located within any one of these segments and used to secure door 32 in a closed position.

The spacing between A-posts 40 (i.e., the width of plate 42) may be set to accommodate the controls within the cabin 12 and hydraulic system components located below and/or in front of cabin 12. In general, the width of plate 42 may be about the same as or just larger than a width of the main beam of front frame 14 (referring to FIG. 1), such that plate 42 (together with A-posts 40) does not block a view otherwise available to the operator of machine 10. That is, the view that might be available if plate 42 were to be omitted is already blocked by the main beam of front frame 14. Thus, placing plate 42 at this location and arranging the controls of cabin 12 on plate 42 may not reduce a view available to the operator.

Each B-post 48 may include a single generally straight section that extends from floor 36 to roof 38. As described above, each B-post 48 may be tilted outward at roof 38 away from plane 35. It is contemplated that each B-post 48 may be vertical relative to the fore/aft direction of cabin 12 and/or tilted forward, as desired.

The shape and configuration of A-posts 40 and B-posts 48 may be adapted to enhance unobstructed viewing to the critical areas outside of machine 10. For instance, in some embodiments, these posts may have an elongated (for example, rectangular) cross-section with orthogonal long and short axes (see FIG. 4). And to reduce obstruction of the operator's view, the long axis of the posts may be oriented to be generally parallel to the operator's line of sight from index axis 34.

C-post 46 may be a composite subassembly made from at least four different parts prior to being connected to floor 36 and roof 38. As seen in FIGS. 2 and 4, these parts may include a base member 68, two generally parallel beams 70, and a plate 72 welded between beams 70. Base member 68 may be bent into a general C-shape, with its two terminal ends being connected to floor 36. Beams 70 may be spaced apart from each other, connected at a first end to a center portion of base member 68 (e.g., at a backbone of the C-shape), and connected at a second terminal end to roof 38. In one embodiment, plate 72 may be welded between beams 70 along their length such that two opposing recesses or pockets are formed between beams 70. These recesses may include an internal recess 74 (shown in FIGS. 2 and 4), and an external recess 76 (shown in FIGS. 4 and 6). Recesses 74, 76 may be the result of beams 70 having a width dimension greater than a thickness of plate 72, and plate 72 being connected to beams 70 at a location about halfway through the widths of beams 70. Opposing legs of base member 68 and beams 70 may be generally parallel with plane 35, while the center portion of base member 68 may be generally parallel with floor 36. The legs of base member 68 may extend upward away from floor 36 at the sides of seat 30 (referring to FIG. 1), while beams 70 may be located at a center of cabin 12 behind seat 30.

In an alternative embodiment, each beam 70 may be integral with a portion of base member 68 (e.g., one leg of base member 68) to form a single structure in the shape of a chair. This embodiment may be represented by the dashed line across base member 68 at the intersection with beam 70. In this configuration, two bent structures may be placed adjacent each other, with the portions behind seat 30 and the legs thereof being generally parallel. Each of these structures would have two terminal ends, one located at floor 36 and the other at roof 38. These structures could be fabricated from a single bent beam or from multiple segments that are welded together, as desired.

Figure 5:
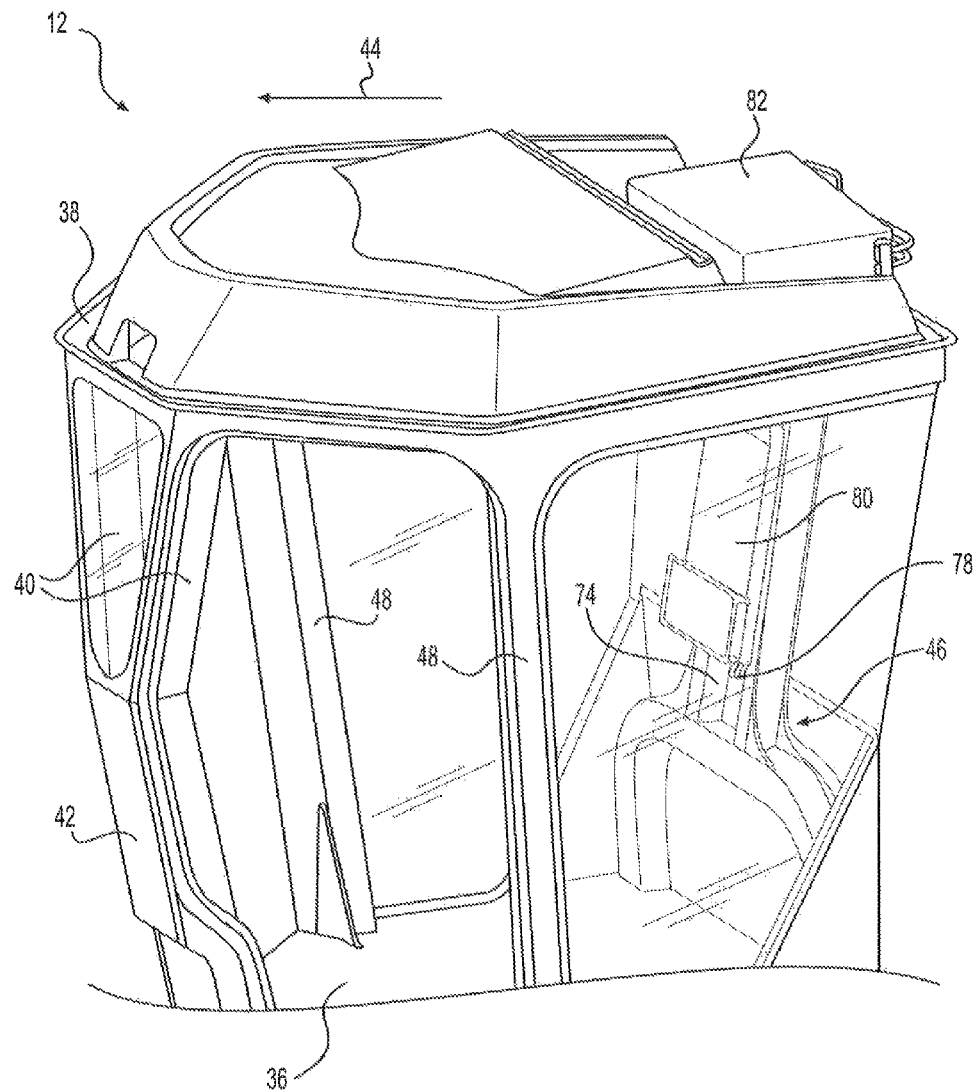
FIGS. 5-7 are additional isometric illustrations of the cabin of FIG. 2.
Figure 6:
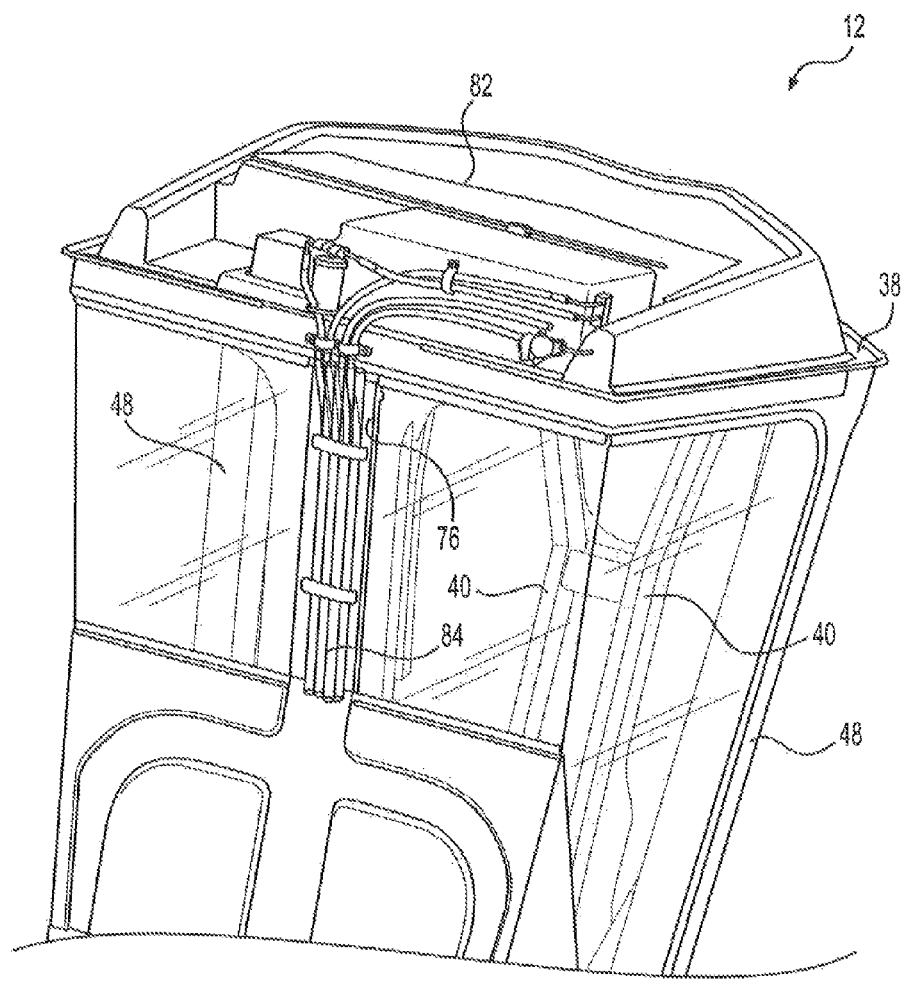

As shown in FIGS. 5 and 6, recesses 74 and 76 may be used for mounting purposes such that space within and outside of cabin 12 may be conserved. In particular, FIG. 5 illustrates recess 74 as being used to mount electrical wiring 78 and an air handling duct 80. In the disclosed example, duct 80 is an air return duct configured to direct cabin air to an HVAC unit 82 located on top of roof 38. Wiring 78 may be associated with HVAC unit 82 or other components in and/or on cabin 12. In some embodiments, duct 80 may be located over the top of wiring 78 and close off recess 74. As shown in FIG. 6, recess 76 may be used to mount high-pressure coolant lines 84 that extend between HVAC unit 82, a heater core (not shown), and/or an air conditioning condenser (not shown). By locating lines 84 within recess 76, these lines 84 may be protected from abrasion and impact that could damage lines 84.

Figure 7:
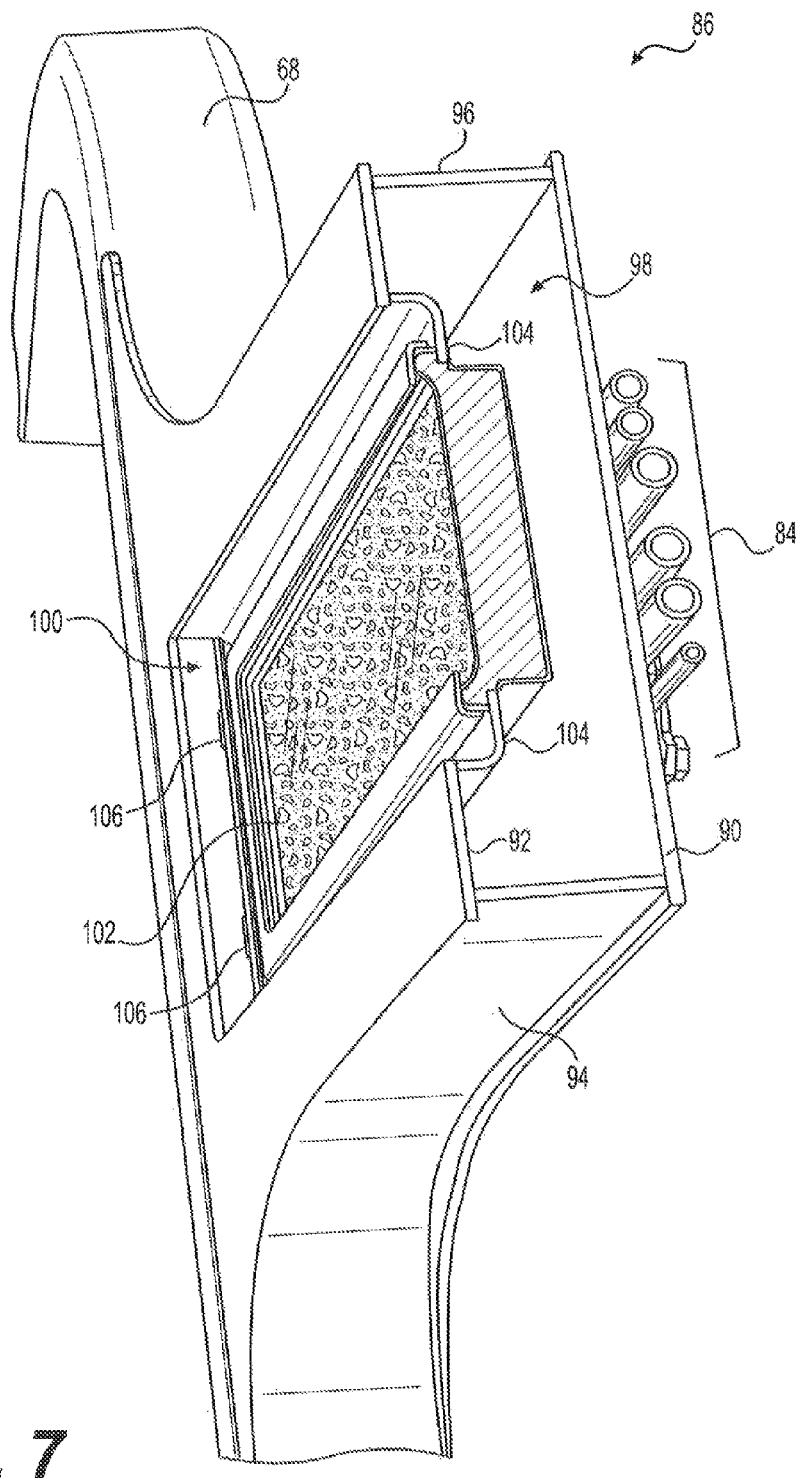

An alternative C-post 86 is illustrated in FIG. 7. Like C-post 46 of FIGS. 2, C-post 86 may include C-shaped base member 68. However, in contrast to C-post 46, C-post 86 may also include a fabricated box-like structure ("structure") 88 that replaces upright beams 70 and duct 80. Structure 88 may include a back plate 90, a front plate 92, and opposing side plates 94, 96 that are connected to (e.g., welded between) back and front plates 90, 92 to form an elongated enclosed space 98 having a rectangular cross-section. Side plates 94, 96 may curve outward at base ends through about 90° to become generally tangent with an upper surface of base member 68. Base ends of back plate 90 and front plate 92 may flare outward to generally match the curvature of side plates 94, 96. Structure 88 may extend between and be connected to (e.g., welded to) base member 68 and roof 38. Coolant lines 84 may connect to an outer surface of rear plate 90.

In addition to structure 88 functioning as rear support for cabin 12 and coolant lines 84, space 98 enclosed by structure 88 may function as a built-in airflow conduit for HVAC unit 82. An opening 100 may be formed within front plate 92 to accommodate a filter 102, which faces inward to cabin 12. In one embodiment, a recessed bracket 104 may be connected front plate 92 around an inner periphery of opening 100. Bracket 104 may be four-sided, each of the sides having an L-shaped cross-section. In the disclosed embodiment, a lower side of bracket 104 includes notches 106 configured to receive corresponding tabs or other engagement features that protrude from a lower end of filter 102. A locking mechanism (e.g., a thumb screw—not shown) may connect an upper end of filter 102 to bracket 104, such that filter 102 may be quickly replaced by turning the locking mechanism and lifting the tabs out of notches 106. It is contemplated that other means of connecting filter 102 to structure 88 may be implemented, as desired.

INDUSTRIAL APPLICABILITY

The disclosed cabin may be applicable to any mobile machine where space constraints and operator visibility are important. The disclosed cabin finds particular applicability in construction and earthmoving machines having work tools, wheels, and other structure or moving parts that require close observation. The disclosed cabin provides enhanced operator visibility through a unique configuration that leaves corners of the cabin free of obstruction. Although designed to handle increased stress from large-machine applications, the disclosed cabin may also be suitable for small-machine applications. In addition the disclosed machine cabin may allow for improved packaging of electrical wiring, HVAC ducting, and high-pressure lines through the use of a central C-post having internal and external recesses.

It will be apparent to those skilled in the art that various modifications and variations may be made to the disclosed machine cabin without departing from the scope of the disclosure. Other embodiments of the disclosed machine cabin will be apparent to those skilled in the art from consideration of the specification and practice of the machine cabin disclosed herein. It is intended that the specification and examples be considered as exemplary only, with a true scope of the disclosure being indicated by the following claims and their equivalents.

What is claimed is:

1. A cabin for a mobile machine, comprising:
   a floor;
   a roof;
   at least one A-post located at a leading end relative to a forward travel direction of the mobile machine; and
   a C-post located at a trailing end opposite the at least one A-post, the C-post having two terminal ends located at the floor and a terminal end located at the roof, the C-post including:
      a C-shaped beam having the two terminal ends; and
      two straight beams spaced apart from each other and extending from the C-shaped beam to the roof.

2. The cabin of claim 1, further including a B-post located between the at least one A-post and the C-post, wherein the B-post and the C-post together define an unobstructed corner viewing area therebetween that spans through about 75-95°.

3. The cabin of claim 2, wherein the unobstructed corner viewing area is located only at upper half of the cabin.

4. The cabin of claim 1, wherein:
   the mobile machine includes a seat located within the cabin;
   the two terminal ends are located at opposing sides of the seat; and
   the terminal end is located behind the seat.

5. The cabin of claim 1, further including a plate joining the two straight beams together and forming at least one recess between the two straight beams.

6. The cabin of claim 1, wherein the at least one A-post includes:
   a first section that tilts away from the roof in a forward traveling direction of the mobile machine; and
   a second section that tilts away from the floor in the forward traveling direction to intersect the first section.

7. The cabin of claim 6, wherein the first section tilts away from the roof at an angle that is less than a tilt angle of the second section relative to the floor.

8. The cabin of claim 7, wherein:
   the first section further tilts inward toward a center plane of symmetry that passes through the cabin in a fore/aft direction; and
   the second section includes:
      a base segment connected to the floor and extending toward the roof in general alignment with the center plane of symmetry;
      a knee segment extending from a distal end of the base segment toward the center plane of symmetry; and
      a center segment extending from the knee segment toward the first section in general alignment with the center plane of symmetry.

9. The cabin of claim 1, wherein:
   the mobile machine includes a seat located inside the cabin; and
   the C-post extends from the two terminal ends at opposing outer rear corners of the floor to a center location behind the seat.

10. The cabin of claim 1, wherein:
    the at least one A-post includes two A-posts;
    the cabin further includes two B-posts, each located between one of the two A-posts and the C-post; and
    the two A-posts, the two B-posts, and the C-post form at least four unobstructed corner views with a total horizontal viewing angle of about 260-270°.

11. The cabin of claim 10, wherein the two A-posts further form a front view therebetween having a horizontal viewing angle of about 25-35°.

12. The cabin of claim 10, wherein a horizontal viewing angle between one of the two B-posts and the C-post is greater than a horizontal viewing angle between the one of the B-posts and one of the two A-posts.

13. A cabin for a mobile machine, comprising:
    a floor;
    a roof;
    at least one A-post located at a leading end relative to a forward travel direction of the mobile machine;
    a C-post located at a trailing end opposite the at least one A-post, the C-post being fabricated from two parallel spaced-apart beams to form a first recess therebetween and including a plate connected between the two parallel spaced-apart beams to form the first recess, wherein the C-post further forms a second recess at an opposing side of the plate relative to the first recess between the parallel spaced-apart beams;
    at least one of an air handling duct and a wiring harness mounted within the first recess of the C-post; and
    HVAC coolant lines externally passing through the second recess to an HVAC unit mounted on top of the cabin.

14. A cabin for a mobile machine, comprising:
    a floor;
    a roof;
    at least one A-post located at a leading end relative to a forward travel direction of the mobile machine; and a C-post located at a trailing end opposite the at least one A-post, the C-post having two terminal ends located at the floor and a terminal end located at the roof, the C-post including:
 a C-shaped beam having the two terminal ends; and
 a box-like structure extending from the C-shaped beam to the roof and having an inward facing opening configured to receive an air filter.

\* \* \* \* \*